Figure 2:
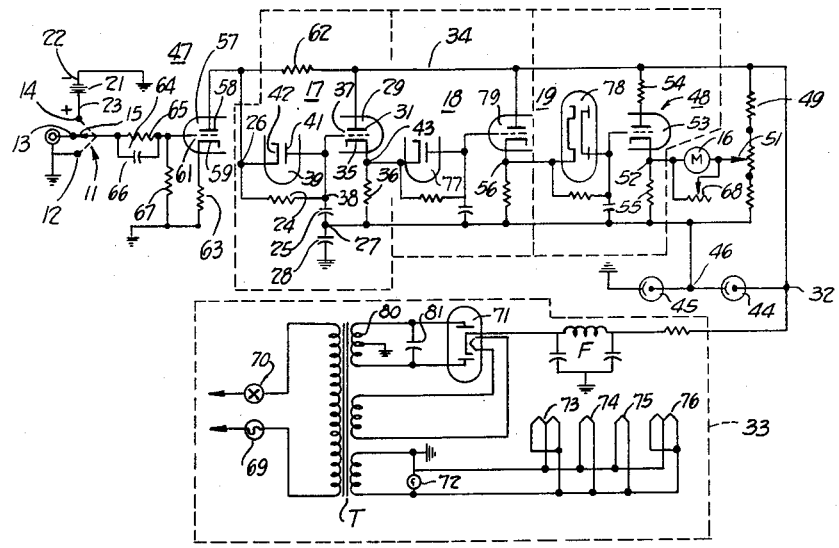

March 22, 1960  R. CHAKERIAN ET AL  2,929,993

PEAK WATTMETER

Filed Dec. 27, 1955

INVENTORS.
RALPH CHAKERIAN
HAROLD E. STEVENS

BY Schramm and Knowles
ATTORNEYS

United States Patent Office 2,929,993
Patented Mar. 22, 1960

2,929,993

PEAK WATTMETER

Ralph Chakerian and Harold E. Stevens, Cleveland, Ohio, assignors to Bird Electronic Corporation, Cleveland, Ohio, a corporation of Ohio Application December 27, 1955, Serial No. 555,383

3 Claims. (Cl. 324—103)

This invention relates to electrical measurement and concerns particularly the measurement of peak values of high frequency alternating-current electrical quantities.

An object of the invention is to enable accurate measurement to be made of peak power of repetitive, steep or complex wave forms, particularly pulsed continuous-wave energy, especially where the average value over one cycle is small and the time duration of the pulse or wave form to be measured is minute in comparison with the repetition period or wave length.

A further object of the invention is to provide measuring apparatus suitable for measurement of television-synchronizing pulses, or pulses in radar equipment where the maximum energy level of the wave is of greater consequence than the average value.

Still another object of the invention is to enable accurate measurements to be made of the peak values of electrical quantities, generally, including voltage pulses and sharp wave peaks and repeated transients as well as wave forms having steep wave fronts.

A further object of the invention is to provide apparatus selectively responsive to the peak value of power of high frequency electrical energy passing in a given direction through a transmission line and unaffected by reflected power.

Still another object of the invention is to provide means for measuring maximum excursions of a high frequency wave, especialy when complex or having sharp, steep wave fronts.

A further object of the invention is to enable voltage waves to be measured accurately without consumption of energy from the signal to be measured and without distortion thereof, especially where the energy of the wave to be measured is minute or where the magnitude is relatively small in comparison with the range within which customary measuring equipment is linear.

Although peak reading devices with zero setting means have been proposed, apparatus capable of accurate calibration at full scale directly against a direct current standard has not heretofore been available. It is accordingly a particular object of the invention to provide for such calibration of the value of scale divisions, and to permit correction for tube aging, drift, temperature effects and the like.

Other and further objects, features and advantages of the invention will become apparent as the description proceeds.

In carrying out the invention for measuring peak power in high radio-frequency electrical systems in accordance with a preferred form thereof, a suitable directional coupling element such as that described in the co-pending application of James R. Bird, Henry J. Calderhead and Herbert H. Heller, Serial No. 490,334, filed February 24, 1955, is employed in conjunction with a coaxial transmission line section adapted to be inserted in a transmission line or, for example, in the line between a signal generator or transmitter and an antenna, or in a coaxial line between a suitable source of radio-frequency energy to be measured and a non-reflective load resistor unit. The coupler is provided with a detector and filter unit to convert the radio-frequency wave into either a direct-current or a pulse voltage, dependent upon whether the detected wave is a continuous wave or a pulse modulated wave, the instantaneous values of which correspond to the instantaneous values of radio-frequency power.

Several stages of pulse stretchers are employed to produce a unidirectional voltage indication responsive to the peak value of the pulse without distorting it or absorbing the energy thereof. A unique direct-current coupling arrangement between the input pulse and the pulse stretchers is provided such that direct-current amplification is obtained and direct-current calibration may be accomplished at both zero and full scale points.

A better understanding of the invention will be afforded by the following detailed description considered in conjunction with the accompanying drawing, in which—

Figure 1:
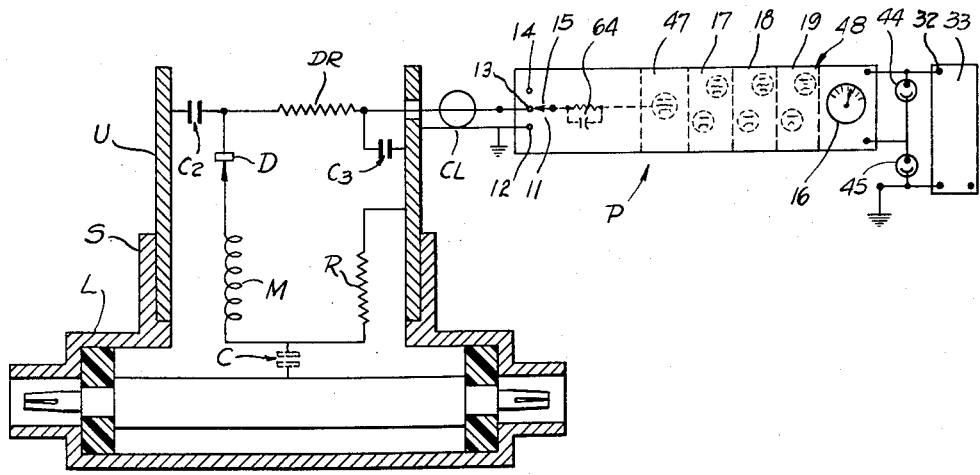

Fig. 1 is a schematic diagram of a peak wattmeter forming an embodiment of the invention, and Fig. 2 is a circuit diagram of the peak reading measuring unit employed in the apparatus of Fig. 1.

Like reference characters are utilized throughout the drawing to designate like parts.

As illustrated in Fig. 1, for measuring the peak value of power pulses transmitted through a transmission line of the concentric type, a line section L is inserted in the coaxial line carrying the power to be measured. The line section L is formed with a support S for a pick-up or detector cartridge U, containing a directional coupling coil or loop M and a crystal detector D. Pulse peak measuring apparatus P is connected to the detector D. The construction of the cartridge U may be of the type described more fully in the aforesaid Bird et al. application. For simplicity only the principal elements of the detector unit U are shown. There is a sampling resistor R, connected at one end to the coupler M and grounded at the other. The mutual inductance of the coupler M with the center conductor of the line L provides inductive coupling and the capacity C between the coupler M and the center conductor provides capacitative coupling. A detector charge condenser $C_2$ is connected between the detector D and ground. The detector D is connected to the measuring apparatus P through a crystal loading resistor DR and a short length of concentric line CL with outer grounded conductor; and a by-pass condenser $C_3$ is provided in the cartridge U. The condensers $C_2$ and $C_3$ and the loading reactor R constitute part of a filter network which functions to remove the high frequency carrier component from the wave energy, yet allows all pulse components to pass unimpeded, thereby converting the sample of energy in the resistor R, picked up by the probe M, into a unidirectional pulse.

Referring to Fig. 2, in order that the peak reading unit P may be calibrated at both zero and full scale values, a calibrating selector switch 11 is provided having three fixed terminals, namely a zero terminal 12, an input terminal 13, and a full scale calibration terminal 14, with a movable switch arm or a selector contact 15.

For actual measurement of the values obtained when the selector contact 15 is connected to the input terminal 13, a direct-current millivoltmeter 16 is provided having a scale calibrated according to the value to be measured. Where peak values of power are to be read the instrument 16 is calibrated in accordance with the square law with the readings proportional to the square of the voltage input. It will be understood, however, that where the unit of Fig. 1 is to be employed alone for measuring peak values of input voltage, the instrument 16 would be a linear scale millivoltmeter.

A plurality of pulse stretcher stages, for example, three stages 17, 18 and 19, are interposed between the input selector switch contact 15 and the millivoltmeter 16. Coupling arrangements are provided such that all of the high frequency components of the pulse applied to the input terminal 13 are recovered to read the peak value of the input wave while at the same time accomplishing direct-current coupling so that the instrument 16 may be calibrated directly against a direct-current standard.

The zero terminal 12 is the terminal to which the contact 15 is connected for calibration of the instrument 16 against zero input, when it is connected to a suitable point in the circuits interposed between the selector contact 15 and the instrument 16. Although the invention is not limited thereto, this point most conveniently constitutes ground and the zero terminal 12 is shown as a grounded terminal with appropriate points in the circuit likewise grounded. For providing a direct-current calibration, a suitable standard cell 21, such as a mercury cell having an output voltage of 1.345 volts is provided which has a grounded negative terminal 22 and a positive terminal 23 connected to the selector switch calibration terminal 14.

Each of the pulse stretcher stages 17, 18 and 19 comprises a resistor and condenser in series with a rectifier across the resistor, and an output cathode follower for current amplification. For example, in the case of the pulse stretcher 17, there is a resistor 24 in series with a condenser 25 between the input terminal 26 of the stage 17 and a fixed-potential terminal 27 which is at ground potential with respect to very high frequency alternating current and is, therefore, for convenience referred to as a substantially zero alternating-current potential terminal. The terminal 27 is maintained at substantially zero alternating-current potential by means of a by-pass condenser 28 connected between it and the ground, in effect connected between the terminal 27 and the zero terminal 12.

The pulse stretcher stage 17 also comprises a cathode follower consisting of a thermionic discharge tube 29 shown as a triode, having an anode 31 connected to the positive terminal 32 of a constant voltage regulated power supply 33 through a positive power supply line 34, a cathode 35 connected through a cathode resistor 36 to the terminal 27, and a control electrode or grid 37 connected to the junction terminal 38 of the resistor 24 and condenser 25. There is a diode-tube type rectifier 39 connected between the terminals 26 and 38, thus shunting the resistor 24.

With the apparatus arranged for measuring positive pulses, as indicated by the polarity of the calibration voltage source 21, and with one stage of phase inversion in a preamplifier, the rectifier 39 is connected with an anode 41 connected to the terminal 38 and a cathode 42 connected to the input terminal 26 of the stage 17. The junction terminal 43 of the cathode 35 and the resistor 36 constitutes the output terminal of the pulse stretcher stage 17.

Although the invention is not limited thereto, the power supply 33 is shown as including two voltage regulator tubes 44 and 45 in series between the positive power supply output terminal 32 and the ground to which the zero terminal 12 is connected, with a common junction terminal 46 of fixed intermediate direct-current potential connected to the terminal 27, which is the zero alternating-current potential terminal. In this manner a fixed direct-current potential above ground is provided for the terminal 27 which constitutes the negative terminal of the pulse stretcher stages 17, 18 and 19, enabling use of an input amplifier 47 which is grounded on the cathode side and does not require a negative power supply source.

The instrument 16 is connected as a cross arm of a bridge formed by the cathode follower 48 of the last pulse stretcher stage 19 and a resistance voltage divider or potentiometer 49 having an adjustable tap 51 thereon. The instrument 16 is connected between the tap 51 and the cathode terminal 52 of the cathode follower 48 constituting the output terminal of the pulse stretcher 19.

The voltage divider 49 is connected between the positive power supply line 34 and the intermediate power supply terminal 46 to which the terminal 27 is also connected so that the portions of the resistor 49 above and below the tap 51 constitute the two arms of a bridge.

In order to provide better voltage division in the bridge circuit the thermionic discharge tube of the pulse stretcher 19, shown as a triode 53, is provided with an anode resistor 54. Thus the anode-cathode impedance of the tube 53 in series with the anode resistor 54 constitutes an additional arm of the bridge; and the cathode resistor 55 constitutes the remaining arm of the bridge. It will be observed that the cathode follower of each of the pulse stretcher stages 17, 18 and 19 is connected between the positive power supply line 34 and the intermediate potential direct-current terminal 46 which is connected to the alternating current zero potential terminal 27. The output terminal 43 of the stage 17 constitutes an input terminal of the stage 18. The cathode terminal 56 of the stage 18 constitutes the output terminal of the stage 18 and the input terminal of the stage 19, the cathode terminal 52 of the stage 19 being the output terminal thereof.

The input amplifier 47 is employed where relatively weak pulses are to be measured and constitutes one or more direct-current amplifier stages. As shown the input amplifier 47 comprises a triode 57 with an anode 58, a cathode 59 and a control electrode or grid 61. The anode 58 is connected to the positive power supply line 34 through a load resistor 62. Preferably a small inverse feedback resistor 63 is provided in the cathode circuit between the cathode 59 and the ground or the zero terminal 12. The selector contact 15 is coupled to the input amplifier grid 61 through a unit 64 capable of passing both direct-current and steep alternating current wave fronts consisting of a high resistance 65 in series between the contact 15 and the grid 61 and a condenser 66 shunting the resistor 65. Preferably a grid leak resistor 67 is also provided beyween the grid 61 and ground.

The pulse stretchers 17, 18 and 19 have successively greater time constants. As will be understood by those skilled in the art, the time constant is proportional to the product of the resistance and the capacity in a resistor-condenser circuit. Accordingly the product of the resistance in the resistor 24 and the capacity of the condenser 25 is less than the product of the corresponding values in the pulse stretcher 18, which in turn is less than the product of the corresponding values in the pulse stretcher 19. Although the invention is not limited thereto, in the arrangement illustrated the resistance values are made the same and the condensers corresponding to condenser 25 are made of successively greater capacity in the successive stage 18 and 19.

The invention is not limited to the use of specific values of electrical dimensions for the various elements. However, it has been found that where pulse peaks of continuous wave energy are to be measured in the range between 25 to 1000 megacycles and in conjunction with couplers for power ranges between 10 watts and 5 megawatts full scale with approximately 50-ohm characteristic impedance of coaxial line connections, satisfactory results are achieved with less than one percent minimum duty factor (product of pulse-width and number of pulses per second) and pulse width as little as 2.5 microseconds, where the circuit components have approximate values as follows: Resistance of the resistor 65 is of the order of 2 megohms with the condenser 66 having a value of 1000 micromicrofarad. The rectifier bridging resistors of the units 17, 18 and 19 have a resistance of 22 megohms with the condensers having capacities of 50 micromicrofarads, 150 micromicrofarads and .25 microfarad respectively. The cathode resistors of the stages 17, 18 and 19 have resistances of 18,000 ohms, the anode resistors 62 and 64 have resistances of 30,000 and 100 ohms respectively. The by-pass condenser 28 has a capacity of 20 microfarads and the rectifiers are units of 6AL5 double diode tubes, the triodes are units of double triode 12AU7 tubes, with a power supply having type OB2 regulator tubes, 44 and 45.

In the specific arrangement shown by way of illustration, the regulated power supply 33 includes a conventional multiple-secondary power transformer T with a control switch 68, an input fuse 69, supplying a bi-phase rectifier tube 71 which energizes the output terminal 32 through a filter F. A warning pilot lamp 72 is provided for indicating energization of tube filaments 73, 74, 75 and 76. The filament 73 serves as the heater for the cathodes 59 and 35 respectively of the two triode elements 57 and 29, which may be in the common envelope of a double triode tube. The filament 74 serves as the heater for diode elements 39 and 77 in the common envelope of a double diode tube. The filament 75 serves as the heater of a double diode tube 78 of the pulse stretcher 19, both diode elements of the tube 78 being connected in parallel. The filament 76 serves as the heater of triode elements 79 and 53 of the pulse stretchers 18 and 19, respectively, the elements 79 and 53 being in the common envelope of a double-triode tube. The high voltage secondary winding 80 of the transformer T is loaded by a high voltage capacitor 81 for somewhat dampening the alternating current wave.

Suitable means are provided for adjusting the value of scale divisions of the indicating instrument 16. For example, as shown, an adjustable shunt 68 may be provided comprising a rheostat connected across the terminals of the instrument 16 having a maximum resistance several times greater than the resistance of the instrument 16, e.g. 2000 ohms.

When it is desired to set the zero reading of the instrument 16, the contact 15 is connected to the zero terminal 12 and the adjustable tap 51 of the voltage divider 49 is moved until the instrument 16 reads zero. The full scale value of the reading of the instrument 16 is adjusted by shifting the contact 15 to the calibration terminal 14 and varying the setting of the rheostat 68 until the instrument 16 reads a predetermined value, which is determined by the voltage of the standard cell 21 and the power range for which the apparatus is intended and which, therefore, depends upon the characteristics of the coupling unit and the dimensions of the other elements between the coupling unit and the instrument 16.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What we claim and desire to secure by Letters Patent of the United States is:

1. Peak reading electrical measuring apparatus for high frequency alternating current electrical energy; said apparatus comprising in combination detector means adapted to be connected to a high frequency transmission line and to derive a unidirectional sample voltage from high frequency alternating current electrical energy on such line; a direct current amplifier having input and output terminals; a direct current measuring instrument having adjustable scale-division calibrating means; a selector switch having zero potential, input and calibrating terminals, said switch including a selector contact movable for connection with any one of the terminals; a unidirectional calibrating voltage source connected between the zero potential and the calibrating terminals; means connecting the detector and the amplifier in a direct current circuit, said circuit means including means connecting said input terminal to the detector means for applying such unidirectional sample voltage thereto and a resistor and a condenser connected in parallel between the selector contact and the input terminal of the amplifier; pulse stretching means having a terminal fixed in potential relative to said zero potential terminal, having resistor means and condenser means series connected between the pulse stretching input terminal and the fixed potential terminal, having current amplifying means with control means connected to and responsive to the potential of the junction of said series connected resistor means and condenser means, and having an input terminal connected to the output terminal of the amplifier and an output terminal connected to the instrument, a potentiometer connected to the pulse stretching means and having an adjustable voltage tap, said instrument being connected between such output terminal of the pulse stretching means and the adjustable tap, said pulse stretching means being adapted to transmit direct current from the amplifier to the instrument and the instrument being adapted to respond thereto, said instrument being adjustable to zero by shifting of the potentiometer tap with the contact of the selector switch on the zero potential terminal, and said calibrating means being adjustable with the contact of the selector switch on the calibrating terminal to adjust the instrument to produce a predetermined reading representing the alternating-current value corresponding to the voltage of the unidirectional calibrating source and with the selector switch contact on the input terminal of the selector switch to read the peak value of the high frequency current on the line.

2. Apparatus as in claim 1 in which the pulse stretching means comprises a plurality of units each having input and output terminals, said units being connected in cascade arrangement and for direct current transmission with the input terminal of one connected to the output terminal of another, the output terminal of said one connected to the input terminal of a third, said resistor means and condenser means including a resistor and a condenser series connected between the input terminal of each unit and the fixed potential terminal, rectifier means including a rectifier shunting the resistor of each unit, said current amplifying means including an amplifier in each unit with control means connected to and responsive to the potential of the junction of the series connected resistor and condenser of the corresponding unit, and the output terminal of the first named amplifier being connected to the input terminal of the first and the instrument being connected to the output terminal of the last pulse stretcher of the cascade arrangement.

3. Apparatus as in claim 1 which includes direct-current power supply means having a terminal connected to said fixed potential terminal and a relatively positive terminal, said current amplifying means being connected between the power supply terminals, the potentiometer constituting a voltage divider connected between the power supply terminals, and the potentiometer and the pulse stretching means together with the instrument comprising a bridge circuit.

References Cited in the file of this patent

UNITED STATES PATENTS

| | | |
|---|---|---|
| 2,419,607 | Terry et al. | Apr. 29, 1947 |
| 2,516,520 | Lamport et al. | July 25, 1950 |
| 2,588,390 | Jones | Mar. 11, 1952 |
| 2,694,181 | Lax | Nov. 9, 1954 |
| 2,708,736 | Creveling et al. | May 17, 1955 |
| 2,729,787 | Yuan | Jan. 3, 1956 |

OTHER REFERENCES

Ryerson et al.: Electronics, September 1945, pages 110–111.

Shepard et al.: Electronics, October 1948, pages 101–103.

Rider: Vacuum Tube Voltmeters, published by John F. Rider, New York, pages 66, 94 and 95 relied on.